United States Patent
Koeppel et al.

(10) Patent No.: US 11,626,764 B2
(45) Date of Patent: *Apr. 11, 2023

(54) SYSTEM, METHOD, AND APPARATUS FOR WIRELESS CHARGING

(71) Applicant: Capital One Services, LLC, McLean, VA (US)

(72) Inventors: Adam Koeppel, Washington, DC (US); Tyler Locke, Washington, DC (US); David Wurmfeld, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/388,047

(22) Filed: Jul. 29, 2021

(65) Prior Publication Data
US 2021/0359555 A1    Nov. 18, 2021

Related U.S. Application Data

(63) Continuation of application No. 16/680,327, filed on Nov. 11, 2019, now Pat. No. 11,121,588, which is a
(Continued)

(51) Int. Cl.
*H04W 4/80* (2018.01)
*H02J 50/80* (2016.01)
(Continued)

(52) U.S. Cl.
CPC ............. *H02J 50/80* (2016.02); *G06F 9/54* (2013.01); *G06K 19/071* (2013.01);
(Continued)

(58) Field of Classification Search
CPC ....... H04W 4/80; H04W 76/10; H04W 8/005; H02J 50/10; H02J 50/80; H02J 7/025;
(Continued)

(56) References Cited

U.S. PATENT DOCUMENTS 10,097,053 B2    10/2018 Koeppel et al.
10,559,986 B2 *  2/2020 Koeppel .............. H04B 5/0031
(Continued)

OTHER PUBLICATIONS

Extended European Search Report dated Jun. 1, 2018 for corresponding European Application No. 17211220.
(Continued)

*Primary Examiner* — Ankur Jain
*Assistant Examiner* — Angelica M Perez
(74) *Attorney, Agent, or Firm* — Troutman Pepper Hamilton Sanders LLP; Christopher J. Forstner; John A. Morrissett

(57) ABSTRACT

Using inductive currents to wirelessly charge a device via a device connected to a power source. This inductive charging may result when a first mobile device recognizes a second mobile device via a wireless connection (e.g., Bluetooth, Bluetooth Low Energy (BLE), Near-Field Communication (NFC), or the like). An application stored on the first mobile device may recognize a second mobile device by transmitting an advertising packet when the first mobile device is connected to a power source. An advertising packet may be received by the second mobile device and the second mobile device may transmit a response to the advertising packet in order to generate a connection between the first and second mobile devices. The response may include data such as, connection strength, response time, connection preferences, and the like. Upon detection and connection, the second mobile device may be wirelessly charged by the first device via inductive charging.

20 Claims, 4 Drawing Sheets

Related U.S. Application Data continuation of application No. 16/387,562, filed on Apr. 18, 2019, now Pat. No. 10,559,986, which is a continuation of application No. 16/142,675, filed on Sep. 26, 2018, now Pat. No. 10,312,749, which is a continuation of application No. 15/666,642, filed on Aug. 2, 2017, now Pat. No. 10,097,053.

(60) Provisional application No. 62/440,540, filed on Dec. 30, 2016.

(51) Int. Cl.
*H04B 5/00* (2006.01)
*H02J 50/10* (2016.01)
*H02J 7/00* (2006.01)
*H04W 76/10* (2018.01)
*G06F 9/54* (2006.01)
*G06K 19/07* (2006.01)
*H04W 8/00* (2009.01)
*G06K 19/04* (2006.01)

(52) U.S. Cl.
CPC ...... *G06K 19/0723* (2013.01); *H02J 7/00034* (2020.01); *H02J 50/10* (2016.02); *H04B 5/0031* (2013.01); *H04B 5/0037* (2013.01); *H04W 4/80* (2018.02); *H04W 8/005* (2013.01); *H04W 76/10* (2018.02); *G06K 19/041* (2013.01); *H04B 5/0012* (2013.01); *H04B 5/0075* (2013.01)

(58) Field of Classification Search
CPC .. H04B 5/0031; H04B 5/0037; H04B 5/0012; H04B 5/0075; G06F 9/54; G06K 19/071; G06K 19/0723; G06K 19/041
See application file for complete search history.

(56) References Cited

U.S. PATENT DOCUMENTS

| | | |
|---|---|---|
| 11,121,588 B2 * | 9/2021 | Koeppel ................. H04W 4/80 |
| 2007/0131759 A1 | 6/2007 | Cox et al. |
| 2008/0296978 A1 * | 12/2008 | Finkenzeller ...... G06K 7/10237 307/104 |
| 2010/0213895 A1 | 8/2010 | Keating et al. |
| 2013/0288600 A1 * | 10/2013 | Kuusilinna ......... H02J 7/00034 455/41.2 |
| 2014/0235166 A1 | 8/2014 | Molettiere et al. |
| 2015/0087228 A1 | 3/2015 | Porat et al. |
| 2015/0155739 A1 | 6/2015 | Walley et al. |
| 2015/0155746 A1 | 6/2015 | Mashimo |
| 2016/0268833 A1 * | 9/2016 | Lee ........................ H02J 50/80 |
| 2017/0170692 A1 | 6/2017 | Xu |

OTHER PUBLICATIONS

Examination Report in related EP Application No. 17211220.3, dated Feb. 15, 2019.

\* cited by examiner

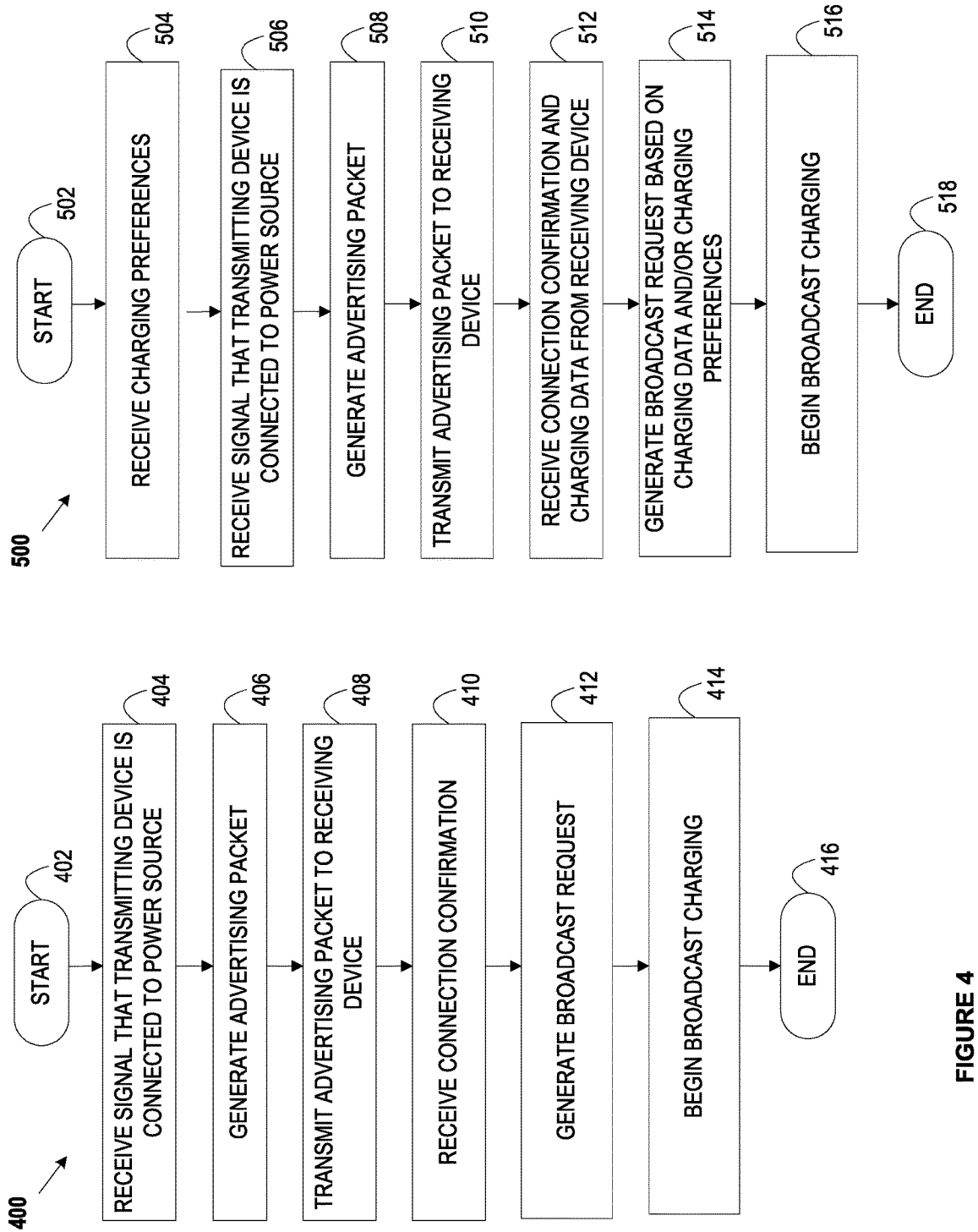

SYSTEM, METHOD, AND APPARATUS FOR WIRELESS CHARGING

CROSS REFERENCE TO RELATED APPLICATIONS

This application is a continuation of, and claims priority under 35 U.S.C. § 120 to, U.S. application Ser. No. 16/680,327, filed Nov. 11, 2019, which is a continuation of U.S. patent application Ser. No. 16/387,562, filed Apr. 18, 2019, now U.S. Pat. No. 10,559,986, which is a continuation of U.S. application Ser. No. 16/142,675, filed Sep. 26, 2018, now U.S. Pat. No. 10,312,749, which is a continuation of U.S. application Ser. No. 15/666,642, filed on Aug. 2, 2017, now U.S. Pat. No. 10,097,053, which claims the benefit of U.S. Provisional Patent Application No. 62/440,540, filed on Dec. 30, 2016, the contents of all of which are hereby fully incorporated by reference in their entireties.

This application is related to Applicant's U.S. application Ser. No. 15/098,935 entitled "Dynamic Transaction Card Power Management" field on Apr. 14, 2016, published as U.S. Patent Application Publication No. 2016/0308371, which claims the benefit of U.S. Provisional Application No. 62/266,324 filed Dec. 11, 2015, U.S. Provisional Application No. 62/270,307 filed Dec. 21, 2015, U.S. Provisional Application No. 62/305,599 filed Mar. 9, 2016, and U.S. Provisional Application No. 62/147,568 filed Apr. 14, 2015; Applicant's U.S. application Ser. No. 14/977,730 entitled "System, Method, and Apparatus for Locating a Bluetooth Enabled Transaction Card" filed Dec. 22, 2015, published as U.S. Patent Application Publication No. 2016/0189143, which claims the benefit of U.S. Provisional Application No. 62/095,190, filed on Dec. 22, 2014; U.S. Pat. No. 9,105,025, entitled "Enhanced Near Field Communications Attachment" filed on May 29, 2014, which claims the benefit of U.S. Provisional Application No. 61/570,275 filed on Dec. 13, 2011 and U.S. Provisional Application No. 61/547,910 filed on Oct. 17, 2011; Applicant's U.S. Provisional Application No. 62/147,568, entitled "System, Method and Apparatus for a Dynamic Transaction Card" filed on Apr. 14, 2015; and Applicant's U.S. application Ser. No. 14/338,423 entitled "System and Method for Exchanging Data with Smart Cards" filed Jul. 23, 2014, published as U.S. Publication No. 2015/0032635, which claims the benefit of U.S. Provisional Application No. 61/857,443 filed on Jul. 23, 2013. The entire contents of these applications are incorporated herein by reference.

BACKGROUND

The present disclosure relates to using inductive currents to wirelessly charge a device via a device that is connected to a power source. This inductive charging may result when, for example, a first mobile device recognizes a second mobile device via a wireless connection (e.g., Bluetooth, Bluetooth Low Energy (BLE), Near-Field Communication (NFC), or the like). An application stored on the first mobile device may initiate a charging signal to a second mobile device by transmitting an advertising packet when the first mobile device is connected to a power source. The advertising packet may be received by the second mobile device and the second mobile device may transmit a response to the first mobile device responding to the advertising packet in order to negotiate a signal from the first device to the second device to allow the second device to utilize inductive charging to charge a power storage device on the second device. The response may include data such as, connection strength, response time, connection preferences, optimum frequencies, negotiated periodic communication checks, and the like. Upon detection and connection, the second mobile device may be wirelessly charged by the first device via inductive charging.

The inductive charging of the second mobile device may be activated automatically upon connection with the first mobile device. The inductive charging of the second mobile device may be activated when an application on the first mobile device detects that the energy stored in the second mobile device is below a predefined threshold. A predefined threshold may be stored in data storage associated with the application on the first mobile device. The inductive charging of the second mobile device may be activated based on pre-stored user preferences.

Smaller mobile devices may be charged by connecting the mobile device to a power source via wires. However, due to size-concerns, smaller mobile devices may lack the requisite space to incorporate the components for wired charging. Additionally, due to their size, owners are less likely to remove the devices from their housing or usual storage or wearable location. Accordingly, smaller mobile devices have a number of problems arising out of their ability to be charged.

As a solution to these problems, smaller mobile devices may be housed in proximity to larger mobile devices. Accordingly, the smaller mobile device may be inductively charged by the larger device. Additionally, when a first mobile device and a second mobile device communicate wirelessly via a Bluetooth, BLE, NFC, or other wireless connection, these wireless channels may be utilized to maximize charging capabilities between the first and second mobile devices. These and other technical improvements may exist.

SUMMARY

Various embodiments of the present disclosure provide inductive charging devices and methods used between a first and second mobile device.

As referred to herein, a first mobile device may be understood to be any of a number of mobile devices, such as an electronic transaction card utilizing active processing on the card (e.g., a "smartcard"), an electronic chip device, a smartphone, a personal digital assistant (PDA), wearable device (e.g., Google Glass, Apple Watch, a fitness tracker, etc.), tablet, laptop, an electronic reader (e.g., iPad, Kindle, Playbook, Touchpad, etc.), telephony device, camera, music playing device, television/video device, and/or other mobile computing device. In one example used herein, a first mobile device may be a smartphone.

As referred to herein, a second mobile device may be understood to be any of a number of mobile devices, such as an electronic transaction card utilizing active processing on the card (i.e., a "smartcard), an electronic chip device, a smartphone, a personal digital assistant (PDA), wearable device (e.g., Google Glass, Apple Watch, a fitness tracker, etc.), tablet, laptop, an electronic reader (e.g., iPad, Kindle, Playbook, Touchpad, etc.), telephony device, camera, music playing device, television/video device, and/or other mobile computing device. In one example used herein, a second mobile device may include an electronic smartcard.

In an example embodiment, a first device may charge a second device when the first device is connected to a power source. For example, when a first device detects that the first device is connected to a power source and the first device detects a second device, the first device may broadcast a transmission that is received at the second device, where the transmission charges the second device.

The first and/or second device may store, transfer, and receive electrical energy using, for example a capacitor, inductor, resistor, battery, a transmitter, a combination of these components, and/or the like. The first and/or second device may store, transfer, and receive electrical energy using an NFC chip, NFC antenna, Bluetooth chip, Bluetooth antenna, BLE chip, BLE antenna, a combination of these components, and/or the like.

A first mobile device may include an application stored on the first mobile device that may, in connection with a processor, microcontroller, and/or data storage, receive input notifying the application that the first device is connected to a power source, generate an advertising packet in response to receiving the notification, transmit an advertising packet to detect a second mobile device, and receive data from the second mobile device in response to the transmitted advertising packet. The application may also include user device data, such as the second mobile device(s) associated with the first mobile device (e.g., the electronic transaction cards associated with a particular mobile device and its user) and/or the second mobile device(s) the first mobile device user desires to charge (e.g., which of the user's electronic transaction cards the user associated with the first mobile device desires to charge). Once the first mobile device receives data from the second mobile device, the first mobile device may transmit data to the second mobile device in order to inductively charge the second mobile device.

The inductive charging of the second mobile device may be activated automatically upon connection with the first mobile device. The inductive charging of the second mobile device may be activated when an application on the first mobile device detects that the energy stored in the second mobile device is below a predefined threshold. A predefined threshold may be stored in data storage associated with the application on the first mobile device. The inductive charging of the second mobile device may be activated based on pre-stored user preferences.

In order to receive and transmit data, a first and second mobile device may include, for example, NFC, WiFi Direct and/or Bluetooth technologies, such as various hardware and software components that use Bluetooth, or a wireless technology standard for exchanging data over short distances. Bluetooth, WiFi Direct or NFC technology may include technology to transmit data using packets, such that each packed is transmitted over a channel. For example, a Bluetooth channel may have a bandwidth of 1 MHz or 2 MHz with the number of channels being 79 or 40, respectively. Hardware that may be included in Bluetooth, WiFi Direct, and/or NFC technology includes a Bluetooth/NFC/WiFi Direct device or chipset with a transceiver, a chip, and an antenna. The transceiver may transmit and receive information via the antenna and an interface. The chip may include a microprocessor that stores and processes information specific to an electronic transaction device and provides device control functionality. Device control functionality may include connection creation, frequency-hopping sequence selection and timing, power control, security control, polling, packet processing, and the like.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which:

FIG. 4 depicts an example method for charging a second mobile device using a first mobile device connected to a power source according to embodiments of the disclosure; and FIG. 5 depicts an example method for charging a second mobile device using a first mobile device connected to a power source according to embodiments of the disclosure.

DETAILED DESCRIPTION

The following description is intended to convey a thorough understanding of the embodiments described by providing a number of specific example embodiments and details involving charging a second mobile device using a first mobile device connected to a power source according to embodiments of the disclosure. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to electronic transaction cards and smartphones For example, many other mobile devices may be charged by another mobile device, such as those devices described herein.

Additionally, an EMV card is used as an example of an electronic transaction card. An electronic transaction card may include any type of transaction card that includes a microcontroller-enabled card used in any type of transaction, including, for example, debit cards, credit cards, prepaid cards, cards used in transportation systems, membership programs, loyalty programs, hotel systems, and the like. An electronic transaction card may include enhanced features, including hardware, software, and firmware, beyond the traditional features of a magnetic stripe or EMV card. The use of "mobile device" in the examples throughout this application is only by way of example. Any type of device capable of communicating with an electronic transaction card may also be used, including, for example, personal computers, tablets, gaming systems, televisions, or any other device capable of communicating with an electronic transaction card. According to the various embodiments of the present disclosure, a mobile device charging an electronic transaction card when the mobile device is connected to a power source is provided.

Figure 1:
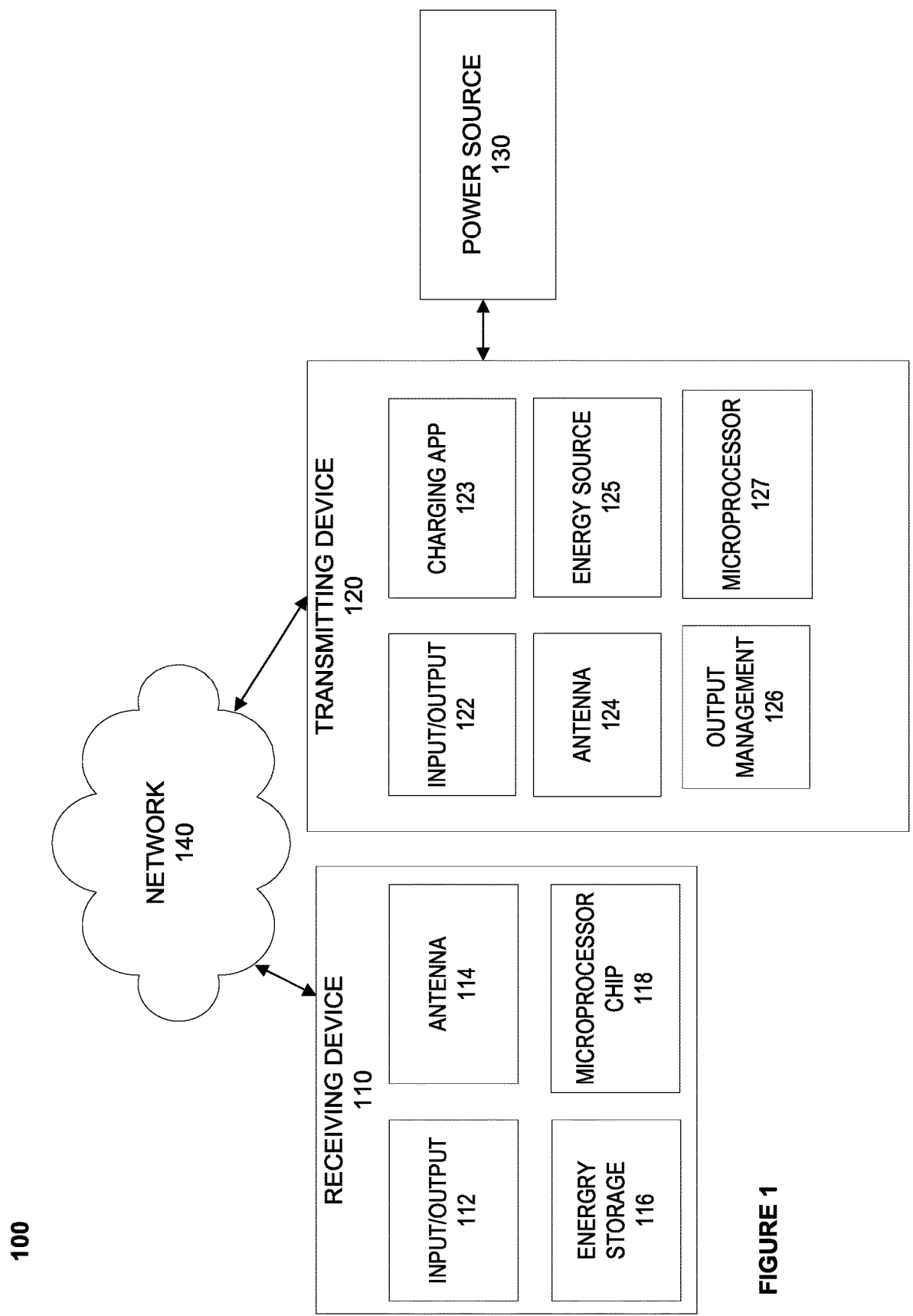
FIG. 1 depicts an example embodiment of a system for charging a second mobile device using a first mobile device connected to a power source according to embodiments of the disclosure.

FIG. 1 depicts an example system 100 including a receiving device 110 that receives energy, a transmitting device 120 that transmits energy, a power source 130, and a network 140. As shown in FIG. 1, an example system 100 may include a transmitting device 120 connected to a power source 130. An example system 100 may include a transmitting device 120 connected to a receiving device 110 connected via network 140.

For example, network 140 may be one or more of a wireless network, a wired network or any combination of wireless networks. For example, network 140 may include one or more of an NFC network, a Bluetooth network, a BLE network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, or any other wired or wireless network for transmitting and receiving a data signal.

In addition, network 140 may include, without limitation, a wide area network ("WAN"), a local area network ("LAN"), a wireless personal area network ("WPAN"), or a global network such as the Internet. Also network 140 may support an Internet network, a wireless communication network, a cellular network, or the like, or any combination thereof. Network 140 may further include one network, or any number of the example types of networks mentioned above, operating as a stand-alone network or in cooperation with each other. Network 140 may utilize one or more protocols of one or more network elements to which they are communicatively coupled. Network 140 may translate to or from other protocols to one or more protocols of network devices. Although network 140 is depicted as a single network, it should be appreciated that according to one or more embodiments, network 140 may comprise a plurality of interconnected networks, such as, for example, the Internet, a service provider's network, a cable television network, corporate networks, and home networks.

Receiving device 110 and/or transmitting device 120 may be, for example, one or more mobile devices, such as, for example, an electronic smartcard (e.g., electronic transaction card), personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Receiving device 110 and/or transmitting device 120 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

Receiving device 110 and/or transmitting device 120 may include at least one central processing unit (CPU), a processor, a microcontroller, and/or the like, which may be configured to execute computer program instructions to perform various processes and methods. Receiving device 110 and/or transmitting device 120 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage, or any other storage mechanism.

Receiving device 110 and/or transmitting device 120 may further include, for example, a processor, which may be several processors, a single processor, or a single device having multiple processors. Although depicted as single elements, it should be appreciated that according to one or more embodiments, receiving device 110 and/or transmitting device 120 may comprise a plurality of receiving devices 110 and/or transmitting device 120.

As shown in FIG. 1, each receiving device 110 and/or transmitting device 120 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, system 100 may include a receiving device 110. A receiving device 110 may include, for example, an electronic transaction card that may be charged by a transmitting device 120. Receiving device 110 may include an input/output component 112, an antenna 114, energy storage 116, and a microprocessor chip 118. Transmitting device 120 may include input/output 122, a charging application 123, an antenna 124, energy source 125, and an output management component 126. Although FIG. 1 depicts these components as single components, these components may include a number of other components and/or may be combined with other components.

Input/output component 112 may include for example, I/O devices, which may be configured to provide input and/or output to receiving device 110 (e.g., keyboard, mouse, display, speakers, printers, modems, network cards, etc.). Input/output component 112 also may include antennas, network interfaces that may provide or enable wireless and/or wire line digital and/or analog interface to one or more networks, such as network 140, over one or more network connections, a power source that provides an appropriate alternating current (AC) or direct current (DC) to power one or more components of receiving device 110, and a bus that allows communication among the various components of receiving device 110. Input/output component 112 may include a display, which may include for example output devices, such as a printer, display screen (e.g., monitor, television, and the like), speakers, projector, and the like. Although not shown, receiving device 110 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Antenna 114 may include an NFC, Bluetooth, BLE, and/or other antenna to communicate with transmitting device 120 in conjunction with, for example an input/output component 112, energy storage 116, and/or microprocessor chip 118. Microprocessor chip 118 may include an NFC chip, EMV chip, and/or other microprocessor chip to communicate with transmitting device 120 and charge receiving device 110 in conjunction with, for example an input/output component 112 and/or antenna 114. For example, an NFC coil 114 may be designed to have a path to energy storage 116 to manage the flow of power to energy storage 116. Receiving device 110 may include a more than one antenna. For example, receiving device 110 may include a first NFC antenna and a second NFC antenna, where the first antenna is dedicated to inductively charge the receiving device 110 via the transmitting device 120. Also, an antenna 114 on receiving device 110 may route through an EMV chip 118, which may then relay power out through a connection to a power management system to charge energy storage 116 (e.g., a battery) on the receiving device 110 (e.g., an electronic transaction card).

For example, a Bluetooth device or chipset may include a Bluetooth transceiver, a chip, such as chip 118, and an antenna, such as antenna 114. The transceiver may transmit and receive data via the antenna 114 and an interface, such as input/output 112. The chip 118 may include a microprocessor that stores and processes data specific to an electronic transaction card and provides device control functionality, including charging. Microprocessor chip 118 may be designed to include an output or circuit that controls power distribution when receiving power from antenna 114 (e.g., NFC coil).

Receiving device may further include energy storage 116 such as a capacitor, inductor, resistor, battery, a transistor, a combination of these components, and/or the like. Energy storage 116 may include a lithium polymer battery, a lithium-metal battery, lithium-ceramic battery, and/or any other type of battery. Energy storage 116 may include a capacitor, inductor, and/or resistor. Energy storage 116 may be constructed out of rigid materials, semiflexible materials, and/or flexible materials. Energy storage 116 may provide power to card components contained within receiving device 110. Energy storage 116 may be a combine, for example, a battery/potting component to support receiving device 110. Energy storage 116 may include, for example, a battery and/or a supercapacitor.

Receiving device 110 may be able to communicate with, for example, transmitting device 120 using RFID, Bluetooth, NFC, WiFi Direct and/or other wireless communications standards or technologies. For example, communications between a receiving device 110 and transmitting device 120 may include methods, systems, and devices such as those described in Applicant's U.S. patent application Ser. No. 14/338,423 filed on Jul. 23, 2014, published as U.S. Patent Application Publication 2015/0032635, the entire contents of which are incorporated herein by reference.

Transmitting device 120 may include input/output component 122 may include for example, I/O devices, which may be configured to provide input and/or output to transmitting device 120 (e.g., keyboard, mouse, display, speakers, printers, modems, network cards, etc.). Input/output component 122 also may include antennas, network interfaces that may provide or enable wireless and/or wire line digital and/or analog interface to one or more networks, such as network 140, over one or more network connections, a power source that provides an appropriate alternating current (AC) or direct current (DC) to power one or more components of transmitting device 120, and a bus that allows communication among the various components of transmitting device 120. Input/output component 122 may include a display, which may include for example output devices, such as a printer, display screen (e.g., monitor, television, and the like), speakers, projector, and the like. Although not shown, transmitting device 120 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Input/output component 122 may enable Industry Standard NFC Transmissions. For example, the input/output component 122 may enable two loop antennas (e.g., antenna 124) to form an air-core transformer when placed near one another by using magnetic induction. Input/output component 122 may operate at 13.56 MHz or any other acceptable frequency. Also, input/output component 122 may provide for a passive communication mode, where the initiator device provides a carrier field, permitting answers by the target device via modulation of existing fields. Additionally, input/output component 122 also may provide for an active communication mode by allowing alternate field generation by the initiator and target devices.

Input/output component 122 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output component 122 may be capable of utilizing standardized transmission protocols, for example but not by way of limitation, ISO/IEC 14443 A/B, ISO/IEC 18092, MiFare, FeliCa, tag/smartcard emulation, and the like. Also, input/output device 142 may be able to utilize transmission protocols and methods that are developed in the future using other frequencies or modes of transmission. Input/output component 122 may also be backwards-compatible with existing techniques, for example RFID. Also, the system may support transmission requirements to meet new and evolving standards including internet based transmission triggered by NFC.

Antenna 124 may include an NFC, Bluetooth, BLE, and/or other antenna to communicate with receiving device 110 in conjunction with, for example an input/output component 122 and/or microprocessor 127. Microprocessor 127 may include an NFC chip, EMV chip, and/or other microprocessor chip to communicate with receiving device 110 in conjunction with, for example an input/output component 122 and/or antenna 124.

For example, a Bluetooth device or chipset may include a Bluetooth transceiver, a chip, such as microprocessor 127, and an antenna, such as antenna 124. The transceiver may transmit and receive data via the antenna 124 and an interface, such as input/output 122. The microprocessor 127 may store and processes data specific to an electronic transaction card and provide device control functionality, such as charging.

Transmitting device 120 may include a charging application 123 that may work in conjunction with input/output 122, antenna 124, energy source 125, output management 126, and microprocessor 127 in order to communicate with receiving device 110, create a connection with receiving device 110, and/or transmit energy to receiving device 110. Charging app 123 may store receiving device 110 preferences, such as preferences regarding a type of antenna to transmit/receive data, an amount of charging time, a threshold charging level at which to begin charging, whether or not to override default settings, default settings such as charging time, antenna usage, only charge when transmitting device 110 is plugged in, a frequency of transmission, and/or the like.

Charging application 123 may work with software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth API supporting BLE, and a real-time data (RTD) API and an NFC Data Exchange Format (NDEF) API for reading/writing. Charging application 123 may include device-specific charging instructions. For example, charging application 123 may include a listing of receiving devices 110 associated with the transmitting device 120 and/or a listing of receiving devices 110 that the transmitting device user desires to charge. By way of example, charging application 123 may be a mobile wallet application with instructions to charge specific electronic transaction cards (e.g., all cards belonging to the owner of the transmitting device 120 and/or specific cards belonging to the owner of the transmitting device 120).

Transmitting device 120 may further include energy source 125 such as a capacitor, inductor, resistor, battery, a transmitter, a combination of these components, and/or the like. Energy source 125 may include a lithium polymer battery, a lithium-metal battery, lithium-ceramic battery, and/or any other type of battery. Energy source 125 may include a capacitor, inductor, and/or resistor. Energy source 125 may be constructed out of rigid materials, semiflexible materials, and/or flexible materials. Energy source 125 may provide power for charging receiving device 110. Energy source 125 may be a combine, for example, a battery/potting component to support transmitting device 120

Transmitting device 120 may further include an output management component 126. For example, when transmitting device 120 is transmitting energy to receiving device 110, output management component 126 may filter information being carried on a particular power surge to optimize power output to receiving device 110. Output management component 126 may limit information carried on a particular power surge by cycles such that for a predetermined amount of time information carried on a particular power surge is filtered thereby temporarily limiting the particular power surge.

A microprocessor 127 may include, for example, a central processing unit (CPU), a processor, a microcontroller, and/or the like. Microprocessor 127 may include an EMV chip or other microchip to provide wireless charging as described herein. Microprocessor 127 may store and process information specific to a receiving device 110 and provides device control functionality. Device control functionality may include connection creation, frequency-hopping sequence selection and timing, power control, security control, polling, packet processing, and the like. The device control functionality and other Bluetooth/NFC-related functionality may be supported using a Bluetooth/NFC API provided by the platform associated with the transmitting device 120 (e.g., The Android platform, the iOS platform). Using a Bluetooth or NFC API, an application stored on transmitting device 120 (e.g., charging app 123) or the device itself may be able to scan for other Bluetooth/NFC devices (e.g., a receiving device 110), query the local Bluetooth/NFC adapter for paired Bluetooth/NFC devices, establish RFCOMM channels, connect to other devices through service discovery, transfer data to and from receiving device 110, and manage multiple connections. A Bluetooth/NFC API used in the methods, systems, and devices described herein may include an API for Bluetooth Low Energy (BLE) to provide significantly lower power consumption and allow a transmitting device 120 to communicate with BLE devices that have low power requirements, such as receiving device 110.

Transmitting device 120 may be any device capable of communicating with a receiving device 110 via, for example, Bluetooth technology, NFC technology, WiFi Direct technology, and/or the like. For example, transmitting device 120 could be an iPhone, iPod, iPad, and/or Apple Watch from Apple® or any other mobile device running Apple's iOS operating system, any device running Google's Android® operating system, including, for example, smartphones running the Android® operating system and/or other wearable mobile devices, such as Google Glass or Samsung Galaxy Gear Smartwatch, devices running Microsoft's Windows® Mobile operating system, and/or any other similar device.

Figure 2:
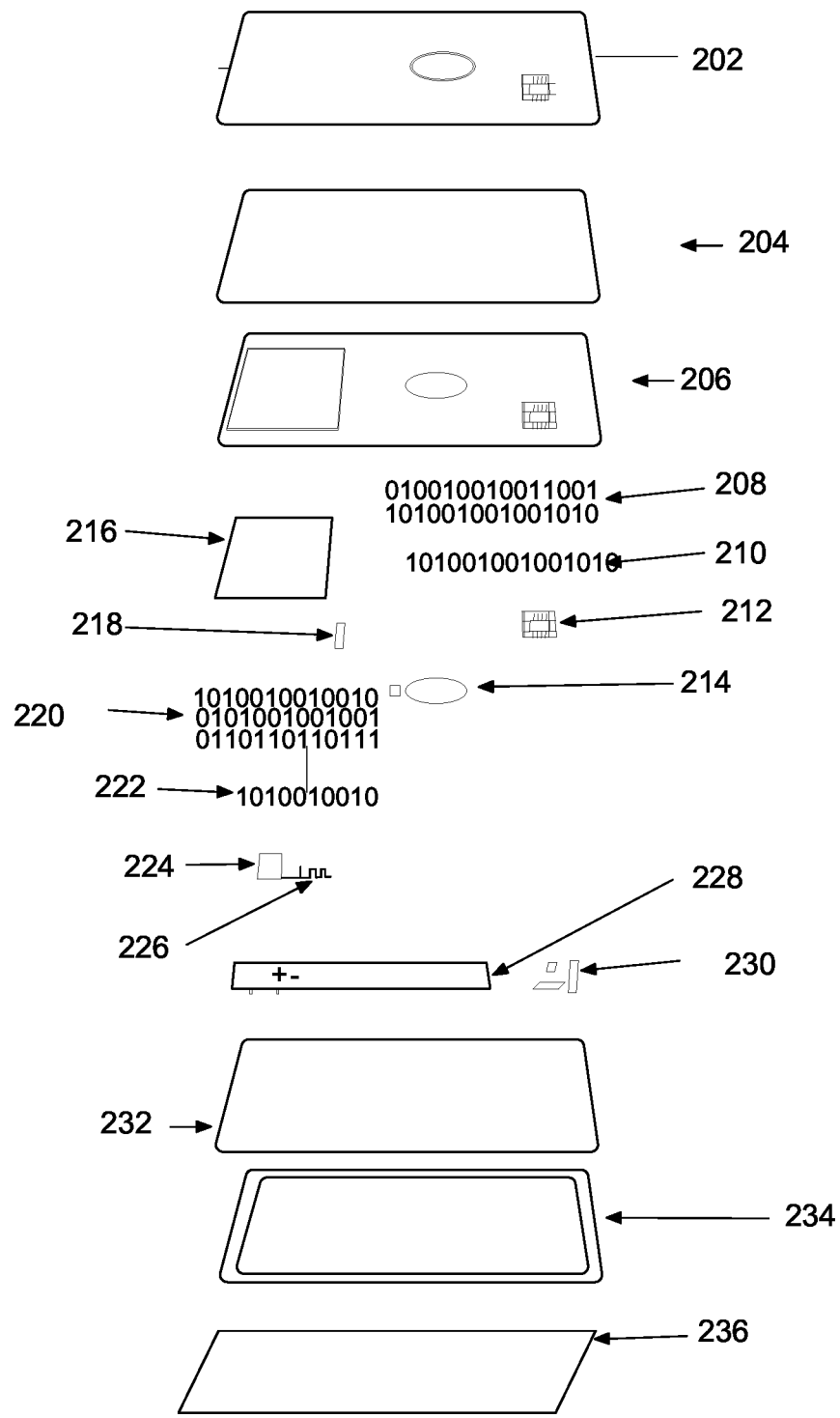
FIG. 2 depicts an example embodiment of an electronic transaction card according to embodiments of the disclosure.

FIG. 2 depicts an example electronic transaction card 200. As shown in FIG. 2, electronic transaction card 200 may include a top output layer 202. The top output layer may be a film covering, a plastic covering, and/or the like. The top output layer 202 may be constructed of scratch-resistant and/or scratch-proof materials. Materials that may be used as a top outer layer 202 may include polyvinyl chloride (PVC), polylactic acid (PLA), acrylonitrile butadiene styrene (ABS), polyethylene terephthalate (PET), Polyethylene terephthalate glycol-modified (PET-G), polyester film or plastic sheet (e.g., Mylar), polycarbonate (PC), and/or the like. An electronic transaction card 200 may further include a top protective layer 204, such as a clear scratch-resistant coating and/or scratch-proof material to protect the underlying components. For example, various scratch-resistant materials include materials coated with a scratch resistant chemical coating, such as a UV curable chemical coating. Scratch-proof materials may include a mineral glass, a sapphire glass, thin film alloys, ITO, ZnO, PVC, PET, BoPET (e.g., Mylar), polyvinylidene fluoride (e.g., Kynar), polyvinylidene difluoride, PC and/or PET-G.

An electronic transaction card may include a potting 206 or filler epoxy around the electrical components to provide strength and/or water resistance. A potting 206 may include a light guide, which may be constructed of optical grade materials such as acrylic, resin, polycarbonate, epoxies, and/or glass. Potting 206 may also include injection molding, such as over molding and/or multi-shot to encapsulate the components of electronic card 200. For example, injection molding may include ABS, thermoplastic elastomers (TPE), thermoplastic vulcanizate (TPV), thermoplastic polyurethane (TPU), PET, polycarbonates (PC), cold lamination of the outer films to the body of the card using thermoactive adhesives, hot lamination of the outer films to the body of the card using thermoactive adhesives, and/or silicone. Electronic transaction card 200 may further include a Java Applet 208 and Java Applet integration 210. Although a Java Applet 208 is used through the specification, any other similar type of code application may be used. Moreover, although Java Applet integration 210 is used throughout this specification, any type of interface may be used to allow the microcontroller to interact with the EMV chip. A Java Applet 208 may include code that executes payments, such as payments made using an EMV chip. A Java Applet 208 may include account-provider specific code to execute display functionality specific to the account provider. Java Applet integration 210 may include coded interfaces to allow the microcontroller to interact with the EMV chip 212.

An EMV chip 212 may include a number of contacts that may interact with and/or be connected to a terminal configured to read data stored on a processor of an EMV chip 212. During an EMV transaction, application cryptograms may be used to send and receive data packets between the electronic transaction card 200 and a terminal, such as a merchant terminal. For example, data packets may include user authentication information which an acquisition system and/or issuing financial institution may use to authenticate electronic transaction card 200 during a transaction. Various cryptographic protocols and/or methods may be used in this data transmission and reception process. Moreover, during a transaction issuing financial institutions and/or acquisition systems may return script commands to the EMV chip 212 via a terminal. These script commands and/or data packets may be transmitted between parties over a network. Script commands may be used, for example, to block transactions, change transaction data stored on the EMV chip (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

Electronic transaction card 200 may also include one or more sensors 214 to receive input. Sensors 214 may include an activation sensor and/or an operation sensor, which may be combined and/or separate. An activation sensor may activate the electronic transaction card 200 and an operation sensor may instruct the electronic transaction card 200 to perform an action based on the received input. An activation sensor may require a security input, such as a biometric input (e.g., fingerprint, eye scan, voice recognition, and/or the like), input indicative of a paired mobile device (e.g., BLE and/or Bluetooth pairing), input indicative of a password (e.g., a password received via a sensor on the electronic transaction card and/or a password received on a paired mobile device), and/or the like. An operation sensor may change a display 216 based on received input, conduct a transaction via, for example an EMV chip 212 and/or contactless payment technologies based on received input, attempt a pairing of electronic card 200 and a mobile device, and/or the like.

By way of example, a sensor 214 may include a capacitive touch sensor, a piezoelectric sensor, an inductive sensor, load cells, a light sensor, a temperature sensor, a resistive touchscreen, including for example an analogue matrix real (AMR) sensors, and/or the like. Sensors 214 may include accelerometers and/or photosensors to detect motion input. Although the sensor 214 is depicted at a particular spot in the transaction card 200, a sensor 214 may be placed at any portion of the card to detect, for example, touch, light, heat, energy, and/or the like. For example, a sensor may be placed around the outer edges of an electronic transaction card 200 or at any spot within the electronic transaction card 200. Sensor 214 also may include the entire exterior surface of electronic transaction card 200.

A display 216 may be provided within the electronic transaction card 200. Although the display as shown includes, for example, a dot matrix display, a number of other display options may be included in the electronic transaction card 200. For example, lighting, such as LED lighting, OLED lighting, electro luminescent (EL) displays, and/or the like, may be used as display components. Display components may also include electronic paper, Mirasol™, TF LCD, Quantum Dot Display, and/or the like. Where lighting is used, various lighting technologies may be used to create a display that indicates a number of things to a cardholder. For example, edge lighting may be used to create a specific visual component in the display. A number of LED or OLED lights may be used to illuminate various portions of the display in order to output information to a card holder.

By way of example, a display 216 may be illuminated using a particular color to relay to the cardholder balance information of an account associated with a transaction card, such as an RGB LED matrix panel and/or RGB LED displays. A red light display may indicate that the account balance is within a first predetermined dollar amount or a first predetermined percentage of the total spending limit, a particular budget, a particular budget category, and/or the like. A yellow light display may indicate that the account balance is within a second predetermined dollar amount or a second predetermined percentage of the total spending limit, a particular budget, a particular budget category, and/or the like. A green light display may indicate that the account balance is within a third predetermined dollar amount or a third predetermined percentage of the total spending limit, a particular budget, a particular budget category, and/or the like. Various colors and or number of categories may be used to output this information to a cardholder. A display 216 may include other display component, such as, for example, LCD technology, ePaper technology (e.g., e-ink), vacuum florescent display technology, and/or the like.

By way of example, a display 216 may include a number of LED or OLED lights and/or light pipes that may be lit in a particular pattern to indicate transaction and/or account information. For example, a display 216 may include a circle, semicircle, or other shape of LED or OLED lighting and/or light pips, where the number of lights illuminated indicates a dollar amount or a percentage of the total spending limit, a particular budget, a particular budget category, and/or the like.

By way of example, a display 216 may be activated via a sensor 214, which may include any type of sensor describe herein. For example, a display may be activated via a touch sensor, where a user is required to tap a location on electronic transaction card 200 a specific number of times and/or for a specific length of time (e.g., double tap, triple tap, one long tap followed by one short tap, and/or the like). In response to the received sensor input, a display 216 may be activated to display particular data, such as data associated with a transaction history, account balance, spending limit, budget categories, budget spending, budget limits, and/or the like. For example, in response to a user double-tapping a sensor point on electronic transaction card 200, a number of LED or OLEDs may be illuminated to display the percentage of a budget consumed (e.g., if a budget is $10,000 and a user has spent $3,000, then 3 out of 10 LEDs or OLEDs may be illuminated to illustrate that 30% of the $10,000 budget has been consumed).

A display may be altered and/or modified, for example, depending on which account or card is selected to be used. For example, where electronic transaction card 200 includes a debit account, a first credit account, and a second credit account, display components 216 may reflect the card number, security code, expiration date, and/or other necessary data indicative of the account (e.g., second credit account) that is being used to execute a transaction. A display may be altered and/or modified when, for example, an electronic transaction card 200 receives new card data and/or new account data from an account holder's mobile device via a wireless connection. For example, where an account has been marked as associated with fraudulent activity, an account holder and/or issuing financial institution may deactivate the card associated with the account and issue a new card. Accordingly, new card data may be transmitted from the issuing financial institution to, for example, an account holder's mobile device via a network, and then from an account holder's mobile device to electronic transaction card 200 via a wireless connection. A display may also be altered and/or modified when electronic transaction card 200 activates a new account. For example, when an account holder applies for a new account (e.g., a new credit card account, a new checking account, and/or the like), if approved, new account data may be transmitted to electronic transaction card 200. New account data may be received at an account holder's mobile device from an issuing financial institution via a network (e.g., using a mobile application, mobile optimized website, and/or the like). New account data may then be transmitted from an account holder's mobile device to electronic transaction card 200 via a wireless connection (e.g., BLE, RFID, NFC, WiFi, and/or the like) or a contact connection (e.g., using a terminal in contact with an EMV processor and/or other microchip).

As described herein, electronic card 200 may be fully or partially pre-loaded with account and/or card data. For example, an applet and placeholder data (or actual data) may be stored within electronic transaction card 200. Accordingly, when an account holder wishes to activate a new account (e.g., account holder who maintains a first credit account may wish to apply for a second credit account), the new account data and/or activation signal may be received from an account holder's mobile device via a wireless connection or a contact connection (e.g., using a terminal in contact with an EMV processor and/or other microchip) and a new account and/or card may be activated and able to be displayed on electronic transaction card 200.

An electronic transaction card 200 may include a display driver 218 that translates instructions from a microcontroller 224 into display images to be displayed using display components 216. A display driver 218 may include an integrated circuit (IC), a state machine, and/or the like that provides an interface function between the display and the microcontroller 224. A display driver 218 may include memory (e.g., RAM, Flash, ROM, and/or the like) and/or firmware that includes font display data.

An electronic transaction card 200 may include firmware 220 and/or a bootloader 222. A bootloader 222 may include code to be executed as electronic transaction card 200 is activated and before any operating system, firmware, or other code is executed on the electronic transaction card 200. A bootloader may be activated via a sensor 214 and energy storage component 228 of the electronic transaction card 200. Bootloader 222 may be activated and/or load an application and/or program upon detection that card 200 has been inserted into a terminal, charger, and/or the like. Bootloader 222 may be activated using only one technique described herein, using multiple techniques described herein, and/or using a card holder or card provider selected technique(s) described herein. Bootloader 222 may only be active during a short interval after the card 200 powers up. Electronic card 200 may also be activated using program code that may be flashed directly to a microprocessor such as microcontroller 224, EMV processor 212, and/or the like. Electronic card 200 may not use a bootloader 222 but instead may cycle between a sleep state and an active state using program code and/or memory.

An electronic transaction card 200 may include a microcontroller 224 and an antenna 226. Antenna 226 may include, for example, a loop antenna, a fractal antenna, and/or the like. Antenna 226 may transmit to and receive signals from a mobile device, such as transmitting device 120, to connect with electronic transaction card 200, charge the electronic transaction card 200, conduct transactions, and display data as described throughout the specification. Microcontroller 224 may communicate with EMV chip 212, Java Applet 208, Java Applet integration 210, sensor(s) 214, power management 230, antenna 226, energy storage component 228, display 216, display driver 218, firmware 220, bootloader 222, and/or any other component of electronic transaction card 200. Microcontroller 224 may control the card operations to conduct transactions and/or display data as described throughout this specification.

Electronic transaction card 200 may include an energy storage component 228. Although energy storage component is depicted as a single component, energy storage component 228 may include a series of energy storage components. By way of example, energy storage component 228 may include a lithium polymer battery, a lithium-metal battery, lithium-ceramic battery, and/or any other type of battery. Electronic storage component 228 may include a capacitor, inductor, and/or resistor. Energy storage component 228 may be constructed out of rigid materials, semi-flexible materials, and/or flexible materials. Energy storage component 228 may provide power to card components contained within electronic transaction card 200. Energy storage component 228 may be a combined use component, for example, a battery/potting component to support electronic transaction card 200.

Electronic transaction card 200 may include a power management component 230 that may manage the charging and discharging of energy storage component 228. Power management component 230 may convert voltage to a predetermined level in order to operate electronic transaction card 200 as discussed throughout the specification. Power management component 230 may detect an amount of power stored in energy storage component 228 and relay that amount to various components of electronic transaction car 200. Power management component 230 and/or energy storage 228 may include, for example, solar power cells to convert solar energy into an electrical current within a solar panel. Power management component 230 and/or energy storage component 228 may include connections to sensors 214 to receive input and activate electronic transaction card 200 (e.g., motion input, thermal input, manual input, touch input, and/or the like).

A flexible printed circuit board (PCB) 232 may be included in electronic transaction card 200. A flexible PCB 232 may include a PCB mounted in a flexible plastic substrate, such as for example, a polyimide, polyether ether ketone, and/or a transparent conductive polyester film. A flexible PCB 232 may be printed, using, for example screen printing, 3D printing, and/or the like, to arrange circuits on a material, such as polyester. Flexible PCB may include electronic components and connections that power electronic transaction card 200. Flexible PCB 232 may control and/or provide integration between the components of card 200. For example, flexible PCB 232 mechanically supports and electronically connects the electronic components of card 200 using, for example, conductive tracks, pads, and/or other features. PCB 232 may be combined with an energy component (e.g., battery component, power component, etc.) as described in Applicant's U.S. application Ser. No. 15/098,935 entitled "Dynamic Transaction Card Power Management" field on Apr. 14, 2016, published as U.S. Patent Application Publication No. 2016/0308371, which claims the benefit of U.S. Provisional Application No. 62/266,324 filed Dec. 11, 2015, the entire content of which are incorporated herein by reference. A flexible PCB may also provide antenna support. A flexible printed circuit (FPC) may be used in place of or in conjunction with flexible PCB 232. FPC 232 may be fabricated with photolithographic technology, such as light exposure of a film material laminated to substrate and/or conductive layers. FPC 232 may be printed, silkscreened, and/or the like. FPC 232 may be used as a structural member for the electronic components of electronic card 200 and/or for the card system as a whole 200. Electronic transaction card 200 may include a chassis 234 as a frame or supporting structure. Chassis 234 may be a mount for a flexible PCB 232 and may be constructed out of flexible or semi-flexible material as well. Chassis 234 may be constructed out of a number of materials, including but not limited to, PVC, PC, ABS, styrene, polycarbonate, polyester, PET, any material that is easily molded, deposited, or laser cut (e.g., organic or inorganic material such as paper, plastic, and/or engineered ceramics), and/or the like. Chassis 234 may be constructed out of a conductive material. Chassis 234 may increase the rigidity of electronic transaction card 200 to prevent damage. Chassis 234 may also be used to detect if electronic transaction card 200 is being held by including sensors 214 around chassis 234. Where chassis 234 is constructed out of a conductive material, a dielectric constant of chassis 234 and/or electronic card 200 may be monitored to detect handling of electronic card 200. A chassis 234 may be used to detect the handling of electronic card 200 via a strain gauge. Chassis 234 may be included within or separate from a card backing 236. Card backing 236 may include a magnetic stripe that may be read using a magnetic stripe reader. A magnetic stripe may store tracks of data that are used to conduct a transaction using an electronic transaction card 200. The tracks of data may include a first track capable of storing alphanumeric characters as well as symbols (e.g., ?, !, &, #, and/or the like), such as account numbers, account holder name, expiration data, security data, and/or other account and/or card related data. The tracks of data may include a second track capable of storing numeric characters such as account numbers, expiration data, security data, and/or other account and/or card related data. The tracks of data may include a third track of data capable of storing numeric characters such as an account number, a PIN, a country code, a currency code, an authorization amount, a balance amount, and/or other account and/or card related data.

A magnetic stripe may be dynamically altered. For example, an electronic transaction card 200 that is paired to a mobile device via, for example, Bluetooth, BLE, RFID, WiFi Direct and/or other wireless technologies, may receive new track data. The new track data may be unformatted, encrypted, encoded, and/or the like when the new track data is transmitted from the mobile device to the electronic transaction card 200. Upon receipt of the new track data, the new track data may be routed to a microprocessor, such the processor of EMV chip 212 and/or microcontroller 224. EMV chip 212 and/or microcontroller 224 may convert, decrypt, and/or decode the received new track data to ensure compliance with any standards. Once decrypted, decoded, and/or formatted, the new track data may be saved on the tracks of the magnetic stripe. The magnetic stripe may be deleted and then the new track data may be recorded onto the tracks. In this manner, track data stored on a magnetic stripe may be altered at any time upon pairing an electronic transaction card 200 with a mobile device.

Card backing 236 may be made of similar material to that of the output layer 202 and/or the top protective layer 204. Card backing 236 may be made out of a plastic material.

Figure 3:
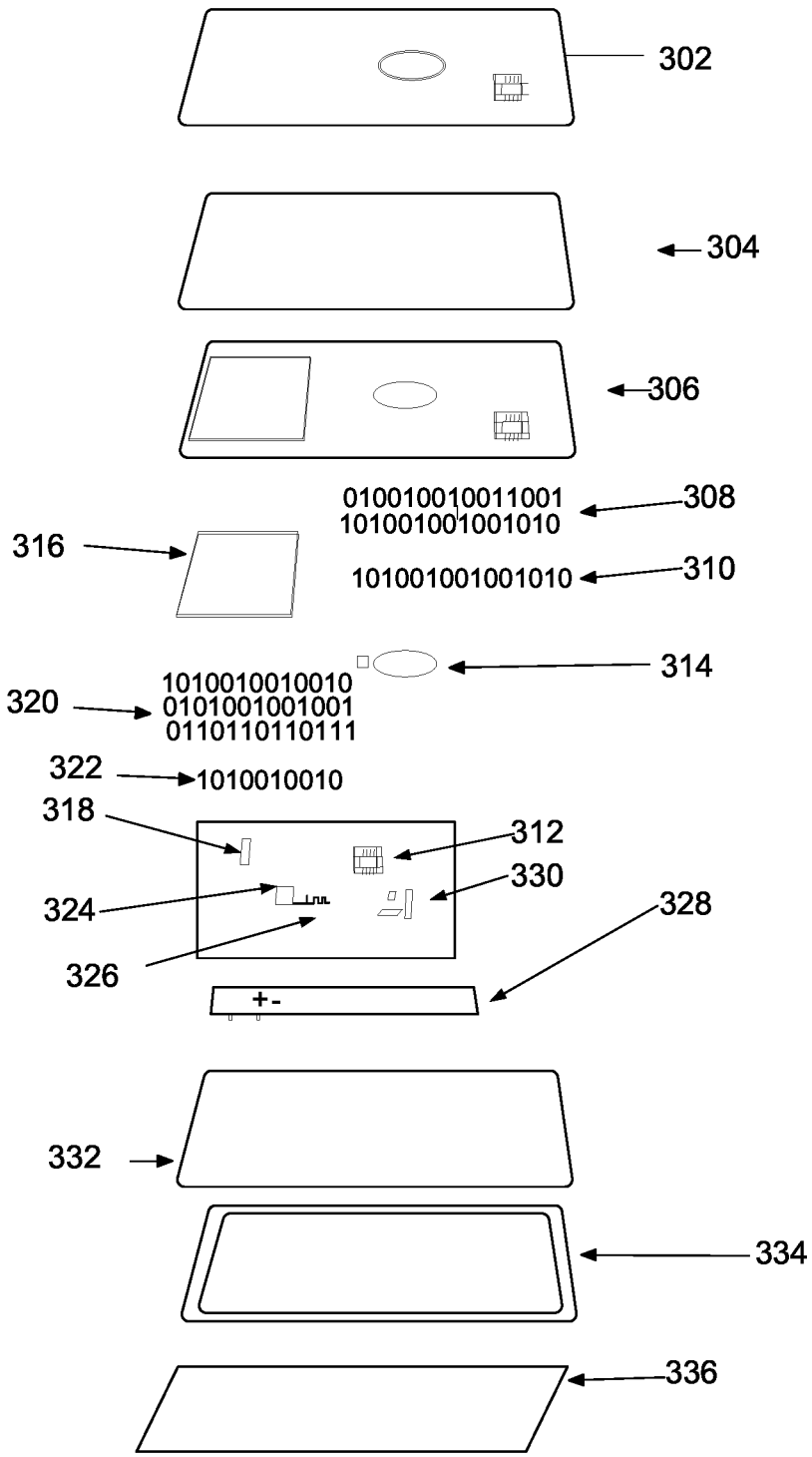
FIG. 3 depicts an example embodiment of an electronic transaction card according to embodiments of the disclosure.

Although the components of electronic transaction card 200 are illustrated in a particular fashion, these components may be combined and or placed throughout an electronic transaction card 200 in any manner, such as those depicted in, for example, FIG. 3.

For example, FIG. 3 illustrates an electronic transaction card having an output layer 302 which may be similar to output layer 202; an outer protective layer 304 which may be similar to outer protective layer 204; potting 306 which may be similar to potting 206; Java Applets 308 which may be similar to Java Applets 208; Java Applet integration 310 which may be similar to Java Applet integration 210; an EMV chip 312 which may be similar to EMV chip 212; a sensor 314 which may be similar to sensor 214; display 316 which may be similar to display 216; display driver 318 which may be similar to display driver 218; firmware 320 which may be similar to firmware 220; bootloader 322 which may be similar to bootloader 222; microcontroller 324 which may be similar to microcontroller 224; antenna 326 which may be similar to antenna 226; energy storage component 328 which may be similar to energy storage component 228; power management 330 which may be similar to power management 230; a PCB 332 which may be similar to PCB 232; chassis 334 which may be similar to chassis 234; and/or card backing 336 which may be similar to card backing 236.

For example, FIGS. 4 and 5 illustrate example methods of using a first device, such as a smartphone, to wirelessly charge a second device, such as an electronic transaction card, using a second mobile device, such as a smartphone. The method 400 may start at block 402. At block 404, the first device may receive a signal that the first device is connected to a power source. For example, upon connecting a smartphone charger to an outlet and the smartphone, the smartphone may detect that the smartphone is connected to a power source and charging (e.g., via the detection of a voltage signal on a connector pin). This may be overridden via a preferences stored on the first device such that the first device may charge the second device regardless of the first device being connected to a power source.

At block 406, in response to the first device receiving a signal that it is connected to a power source, the first device may generate an advertising packet. An advertising packet may search for nearby devices within a predefined range. An advertising packet may provide a second device within a predefined range with data required to establish a wireless connection between the first device and the second device. At block 408, the first device may transmit an advertising packet to a second device.

At block 410, the first device may receive a response from the second device confirming a wireless connection between the two devices. The wireless connection may be using NFC technologies, Bluetooth technologies, and/or BLE technologies as described herein. A connection confirmation response may, but need not, include data describing an amount of energy stored on the second device, an optimal frequency for energy transmission, and the like. For example, an amount of energy stored may be relayed by a measurement of energy or a percentage of energy storage that is charged or uncharged. A connection confirmation response may include data to determine the distance between the first device and the second device and/or between specific components of the first device and second device.

At block 412, the first device may generate a broadcast request to activate a charging application on the first device and/or an output management component of the first device. The charging application may manage charging by transmitting frequencies at the frequency received in the confirmation response. A charging application may maintain second device charging requirements to more optimally charge the second device or alter the frequency received in the confirmation response. For example, the charging application may maintain distance-frequency data to vary frequency based on the distance between the first and second devices. The charging application may store a predefined charge minimum associated with the second device. For example, the charging application may store an 80% charge minimum so that if the second device is more than 80% charged, the charging application will delay broadcasting until the second device is less than 80% charged. Output management may determine which outputs are available for charging.

At block 414, the first device may begin broadcasting to charge the second device. Charging may continue for a predefined period of time (e.g., 2 hours, 30 minutes, etc.) or until the second device is charge to a predefined amount (e.g., 100% charged, 95% charged, etc.). The broadcasting may transmit at frequencies determined by the response packet, distance-frequency data, and/or the like. The method may end at block 416.

The method 500 may start at block 502. At block 504 the first device may receive charging preferences via an input/output component. For example, a first device user may input charging preferences into a smartphone via a touch screen that interacts with a charging application on the smartphone. Charging preferences may include setting a minimum charge point at which to start charging a second device. For example, a user may not wish to charge a second device unless that device is below 50% charged. Charging preferences may include setting a charge start time, a charge end time, and/or a total charge time. For example, a first device user may desire to begin charging a second device no earlier than 7:00 p.m. and end charging a second device no later than 5:00 a.m. A first device user may desire that charging a second device only last 2 hours at most. Charging preferences may include a preferred mode of communication between a first and second device in order to inductively charge the second device. For example, a user may prefer to use NFC technologies over BLE, Bluetooth, RFID, or other radio communication protocol technologies for charging.

At block 506, the first device may receive a signal that the first device is connected to a power source. For example, upon connecting a smartphone charger to an outlet and the smartphone, the smartphone may receive a signal that the smartphone is connected to a power source and charging.

At block 508, in response to the first device receiving a signal that it is connected to a power source, the first device may generate an advertising packet. An advertising packet may search for nearby devices within a predefined range. An advertising packet may provide a second device within a predefined range with data required to establish a wireless connection between the first device and the second device. At block 510, the first device may transmit an advertising packet to a second device.

At block 512, the first device may receive a response from the second device confirming a wireless connection between the two devices. The wireless connection may be using NFC technologies, Bluetooth technologies, and/or BLE technologies as described herein. A connection confirmation response may include data describing an amount of energy stored on the second device. For example, an amount of energy stored may be relayed by a measurement of energy or a percentage of energy storage that is charged or uncharged. A connection confirmation response may include data to determine the distance between the first device and the second device and/or between specific components of the first device and second device.

At block 514, the first device may generate a broadcast request to activate a charging application on the first device and/or an output management component of the first device. A charging application may maintain second device charging requirements to optimally charge the second device. For example, the charging application may maintain distance-frequency data to vary frequency based on the distance between the first and second devices. The charging application may store a user preferences as described above. Using the data in the response from the second device, the user preferences, and/or the charging requirements, a first device may generate a broadcast request. Output management may determine which outputs are available for charging.

At block 516, the first device may begin broadcasting to charge the second device. Charging may continue based on user preferences or device requirements stored in the first device. The method may end at block 518.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise, various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A method comprising:
    establishing a wireless connection between an electronic transaction card and a mobile device associated with an account holder of the transaction card;
    receiving, via a Near-Field Communications (NFC) antenna of the transaction card, a response from the mobile device including a first frequency for energy transmission and distance data;
    determining, with a microprocessor of the transaction card, a distance between the transaction card and the mobile device based on the distance data;
    determining, with the microprocessor, a second frequency for energy transmission based on the first frequency and the distance; and
    broadcasting, via the NFC antenna, a first signal to the mobile device at the second frequency to charge the mobile device via inductive charging.

2. The method of claim 1, wherein the response from the mobile device further includes at least one of the following: connection strength, response time, or connection preferences.

3. The method of claim 1, wherein the response from the mobile device further includes an amount of energy stored on the mobile device, the method further comprising:
    determining, with the microprocessor, that the amount of energy stored on the mobile device is below a predefined threshold.

4. The method of claim 1, further comprising:
    receiving, via the NFC antenna, a second signal from the mobile device including a new account number associated with the account holder;
    activating, with the microprocessor, the new account number; and
    updating, with the microprocessor, a display on the transaction card to show the new account number.

5. The method of claim 1, further comprising:
receiving, at a sensor of the transaction card, a security input from the account holder; and
communicating, via the NFC antenna, with a merchant terminal to conduct a transaction using contactless payment technology, wherein the communicating includes sending user authentication information to authenticate the transaction in response to the security input.

6. The method of claim 1, wherein the first frequency for energy transmission and the second frequency for energy transmission are used for charging an energy storage component of the mobile device.

7. A method comprising:
determining, with a microprocessor of a mobile device, that the mobile device is connected to a power source;
activating, with the microprocessor, a charging application stored on the mobile device;
establishing a wireless connection between the mobile device and an electronic transaction card;
receiving, via a Near-Field Communications (NFC) antenna of the transaction card, a response comprising data to determine (1) a distance between the mobile device and the transaction card and (2) a charge level of the transaction card;
broadcasting, via the NFC antenna, a first signal at a first frequency for energy transmission to the transaction card to charge the transaction card via inductive charging;
determining, with the charging application, one or more charging preferences for the transaction card;
altering, with the charging application, the first frequency to a second frequency for energy transmission based on the one or more charging preferences; and
broadcasting, via the NFC antenna, a second signal at the second frequency to the transaction card to charge the transaction card via inductive charging.

8. The method of claim 7, wherein the charging application comprises instructions to charge a first plurality of transaction cards associated with an authorized cardholder of the transaction card.

9. The method of claim 7, wherein the one or more charging preferences include a minimum charge level at which to begin charging the transaction card, the method further comprising:
determining, with the microprocessor, that the charge level of the transaction card is below the minimum charge level.

10. The method of claim 7, wherein the one or more charging preferences include one or more of:
an optimal frequency for energy transmission at which to charge the transaction card, the optimal frequency based on a predefined charge minimum associated with the transaction card;
a connection preference;
a type of antenna to transmit and receive data;
an amount of charging time;
distance-frequency data for the transaction card; and
override data indicating whether to override one or more default settings, the one or more default settings comprising a charging time, a frequency of transmission, an antenna usage, and charging only when the transaction card is plugged in.

11. The method of claim 10, wherein the charging application alters the optimal frequency based on the distance between the mobile device and the transaction card and the distance-frequency data.

12. The method of claim 7, wherein the one or more charging preferences include a start time and an end time, the method further comprising:
determining, with the charging application, that a current time is after the start time.

13. The method of claim 7, further comprising:
determining, with the charging application, that a current time is after an end time; and
terminating, with the charging application, the first signal to stop inductively charging the transaction card.

14. A method for wirelessly charging a mobile device, the method comprising:
receiving, at a microprocessor of a transaction card, a signal that an energy storage component of the transaction card is connected to a power source;
establishing a wireless connection between the transaction card and the mobile device;
receiving, via a Near-Field Communications (NFC) antenna, a first response from the mobile device indicating that the wireless connection is established between the transaction card and the mobile device;
broadcasting, via the NFC antenna, a first signal at a first frequency for energy transmission to the mobile device to charge the mobile device via inductive charging;
receiving, via the NFC antenna, a second response from the mobile device including one or more charging preferences;
altering, with a charging application on the transaction card, the first frequency to a second frequency for energy transmission based on the one or more charging preferences; and
broadcasting, via the NFC antenna, a second signal at the second frequency to the mobile device to charge the mobile device via inductive charging.

15. The method of claim 14, further comprising:
detecting an interference of the first signal at the first frequency between the NFC antenna and the mobile device, wherein altering the first frequency to the second frequency is further based on the detected interference.

16. The method of claim 14, wherein:
the one or more charging preferences include an optimal frequency for charging; and
the charging application alters the optimal frequency based on a distance between the transaction card and the mobile device.

17. The method of claim 14, wherein the one or more charging preferences include a minimum charge level at which to begin charging the mobile device, the method further comprising:
determining, with the microprocessor, that a charge level of the mobile device is below the minimum charge level.

18. The method of claim 14, wherein the power source comprises a Europay, MasterCard, and Visa (EMV) chip on the transaction card in electrical communication with a merchant terminal.

19. The method of claim 14, wherein the one or more charging preferences include an amount of charging time for the mobile device, the method further comprising:
determining, with the microprocessor, that the amount of charging time has been met or exceeded; and
terminating, with the charging application, the first signal to stop inductively charging the mobile device.

20. The method of claim 14, wherein the one or more charging preferences include a maximum charge level at which to stop charging the mobile device, the method further comprising:
 determining, with the microprocessor, that a charge level of the mobile device is equal to, or greater than, the maximum charge level; and
 terminating, with the charging application, the first signal to stop inductively charging the mobile device.

* * * * *